United States Patent [19]

Schmidt et al.

[11] Patent Number: 5,087,291
[45] Date of Patent: Feb. 11, 1992

[54] RARE EARTH-TRANSITION METAL SCRAP TREATMENT METHOD

[75] Inventors: Frederick A. Schmidt; David T. Peterson, both of Ames; John T. Wheelock, Nevada; Lawrence L. Jones, Des Moines; Lanny P. Lincoln, Woodward, all of Iowa

[73] Assignee: Iowa State University Research Foundation, Inc., Ames, Iowa

[21] Appl. No.: 591,046

[22] Filed: Oct. 1, 1990

[51] Int. Cl.$^5$ .............................................. C22B 59/00
[52] U.S. Cl. ......................................... 75/581; 75/610
[58] Field of Search ................................... 75/610, 581

[56] References Cited

U.S. PATENT DOCUMENTS

| | | | |
|---|---|---|---|
| 2,950,962 | 8/1960 | Carlson et al. | 75/84.4 |
| 3,150,964 | 9/1964 | Carlson et al. | 75/84 |
| 4,308,474 | 12/1981 | Savage et al. | 310/26 |
| 4,578,242 | 3/1986 | Sharma | 75/610 |
| 4,612,047 | 9/1986 | Schmidt et al. | 420/83 |
| 4,636,353 | 1/1987 | Seon et al. | 420/416 |

Primary Examiner—Peter D. Rosenberg
Attorney, Agent, or Firm—Tilton, Fallon, Lungmus & Chestnut

[57] ABSTRACT

Rare earth-transition metal (e.g. iron) scrap (e.g. Nd-Fe-B scrap) is melted to reduce the levels of tramp oxygen and nitrogen impurities therein. The tramp impurities are reduced in the melt by virtue of the reaction of the tramp impurities and the rare earth to form dross on the melt. The purified melt is separated from the dross for reuse. The oxygen and nitrogen of the melt are reduced to levels acceptable for reuse of the treated alloy in the manufacture of end-use articles, such as permanent magnets.

17 Claims, 2 Drawing Sheets

RARE EARTH-TRANSITION METAL SCRAP TREATMENT METHOD

CONTRACTUAL ORIGIN OF THE INVENTION

The U.S. Government has rights in this invention pursuant to Contract No. W-7405-ENG-82 between the U.S. Department of Energy and Iowa State University, Ames, IA, which contract grants to the Iowa State University Research Foundation, Inc. the right to apply for this patent.

FIELD OF THE INVENTION

The present invention relates to the treatment of rare earth/transition metal (e.g., iron) scrap by a fluxless melting method to reduce tramp impurities, especially oxygen and nitrogen, to levels acceptable for reuse in the manufacture of end-use articles, such as permanent magnets.

BACKGROUND OF THE INVENTION

A number of rare earth-iron alloys have been developed which exhibit desirable magnetostrictive properties as described, for example, by Savage et al. in U.S. Pat. No. 4,308,475 which issued Dec. 29, 1981. The alloys described therein (e.g., Tb-Dy-Fe alloys) have been found to be useful in magnetostrictive transducers, delay lines, variable frequency resonators and filters.

Another group of alloys based on rare earth-iron-boron compositions is described in U.S. Pat. No. 4,612,047 issued Sept. 16, 1986 and by Seon et al. in U.S. Pat. No. 4,636,353 issued Jan. 13, 1987. The alloys (e.g., Nd-Fe-B) exhibit highly desirable magnetic properties for use as permanent magnets.

The commercialization of these rare earth/iron alloys has progressed to the point that relatively large quantities of rare earth/iron alloy scrap have been generated from the various manufacturing operations used to fabricate the alloys into suitable magnet components, electrical components and the like. The rare earth/iron alloy scrap generated by these fabrication operations varies considerably in form from dry, bulky, relatively large scrap pieces to a fine powder or dust referred to as "swarf". The bulky scrap pieces are produced primarily from casting and fabricating operations, while the swarf is produced primarily from abrasive cutting and grinding operations.

Industries that fabricate rare earth/iron alloys into articles of manufacture require some method to dispose of the rare earth/iron scrap and recover the alloy for reuse. This is especially true in the case of the rare earth/iron swarf generated in the various fabrication operations.

There is a need to dispose of the rare earth/iron alloy scrap in a manner that allows recovery of the alloy in a condition of purity amenable for reuse in the manufacture of end-use articles (e.g., permanent magnets) without the need for further alloy purification. In particular, a treatment process is needed that allows recovery of the rare earth/iron alloy in a manner effective to remove tramp non-metallic impurities, such as oxygen and nitrogen, picked up by the alloy during the various fabrication operations. The tramp elements must be reduced to levels specified by manufacturers of end-use articles, such as permanent magnets.

An object of the present invention is to address these needs by providing a fluxless remelting method applicable to rare earth/transition metal (e.g., iron) scrap for recovering a rare earth-transition metal alloy at a purity level acceptable for reuse in the manufacture of end-use articles.

SUMMARY OF THE INVENTION

The present invention contemplates a method of treating rare earth-transition metal scrap contaminated with one or more tramp impurities, such as oxygen and nitrogen, picked up by the scrap from previous fabrication operations employed to make end-use articles. The method of the present invention involves the fluxless melting of the rare earth-transition metal scrap in a manner to substantially reduce the concentration of the tramp impurities, such as especially oxygen and nitrogen, to levels acceptable for reuse of the alloy in the manufacture of end-use articles.

The method of the invention involves the recognition that certain tramp impurities, such as oxygen and nitrogen, can be removed from a melt of the rare earth-transition metal scrap by virtue of the high reactivity of the rare earth toward the oxygen and nitrogen present in the melt and the relatively low solubility of the oxides and nitrides of the rare earth in the melt. In particular, the scrap is typically melted under temperature and time at temperature conditions as to form dross on the melt by reaction of the impurity element(s) and a rare earth constituent of the melt. For example, the dross typically comprises oxides/nitrides of the rare earth present in the melt. Formation of the dross in this manner substantially reduces oxygen and nitrogen concentrations in the melt. The concentration of the rare earth element in the alloy melt may be adjusted as needed to accommodate for loss thereof as a result of reaction with the impurity element.

The purified melt is separated from the dross to provide a melt with reduced levels of tramp oxygen and nitrogen for reuse in the manufacture of end-use articles. The melt is preferably separated from the dross by a bottom pouring technique wherein the melt is selectively discharged from the container via a bottom opening so as to leave the dross adhering to the interior container surfaces. The container is made of a refractory material, preferably alumina, to which the dross readily adheres to facilitate separation of the melt from the dross during the bottom pouring operation. Other melt/dross separation techniques may be employed in practicing the invention, however.

The method of the invention achieves a substantial reduction in the concentrations of oxygen and nitrogen in the melt. For example, a reduction in the oxygen and nitrogen concentration levels by generally a factor of about 25 and about 10, respectively, has been achieved as will become apparent. The reduced levels of the tramp oxygen and nitrogen in the purified rare earth-transition metal alloy render it reusable in the manufacture of end-use articles, such as permanent magnets.

DETAILED DESCRIPTION OF THE INVENTION

Figure 1:
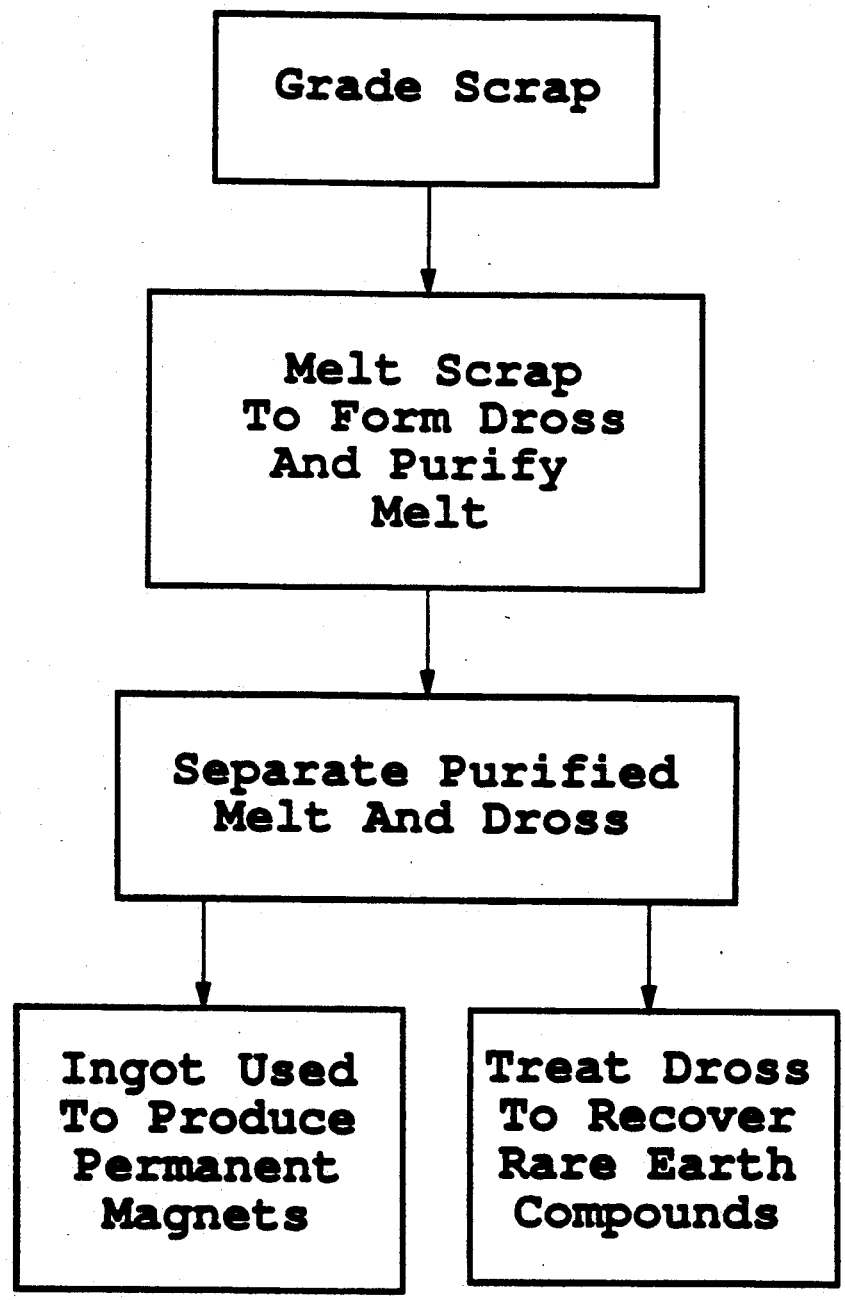
FIG. 1 is a flow sheet illustrating the sequential method steps of one embodiment of the invention.

Referring to FIG. 1, the various steps involved in practicing one embodiment of the invention are illustrated. In this embodiment, rare earth-transition metal (e.g., iron) scrap is typically received from one or more fabricating operations, either on-site or off-site, and initially segregated (graded) by alloy composition, size, shape, and other factors. For example, fine rare earth-transition metal alloy dust or powder (referred to as swarf) of like or similar composition is typically separated for treatment whereas dry, bulky scrap pieces of the same or similar composition are typically segregated into one or more groups by size and shape for treatment.

Bulky scrap pieces typically are comprised of rare earth-transition metal alloy pieces from prior alloy preparation steps and of scrap magnet material (rare earth-transition metal alloys) generated during fabrication operations such as pressing, sintering, etc. Also included are fabricated rare earth-transition metal alloy magnets which have been rejected for use as a result of low magnetic strength as well as fabrication and other defects. Some rare earth metal in particulate or other form may be present with the other scrap pieces depending upon the source of the scrap.

The method of the invention is capable of treating a wide variety of binary, ternary and other rare earth-transition metal alloy scrap compositions. In general, alloy scrap treatable in accordance with the invention will comprise (a) one or more transition metals such as Fe, Co and/or Ni, and (b) one or more rare earth such as Nd, Dy, Tb, Pr, Sm, Ho, La, Ce, Eu, Gd, Er, Tm, Yb, Lu, Y, and/or Sc, and (c) and other optional alloyants such as B or other non-metallic elements that may be used for one reason or another in the alloy compositions. As mentioned above, the scrap will typically be segregated for treatment into groups having the same or similar compositions. For example, Tb-Dy-Fe, alloy scrap will be segregated and treated separate and apart from Nd-Fe-B alloy scrap to preserve the alloy composition to the maximum extent possible.

Figure 2:
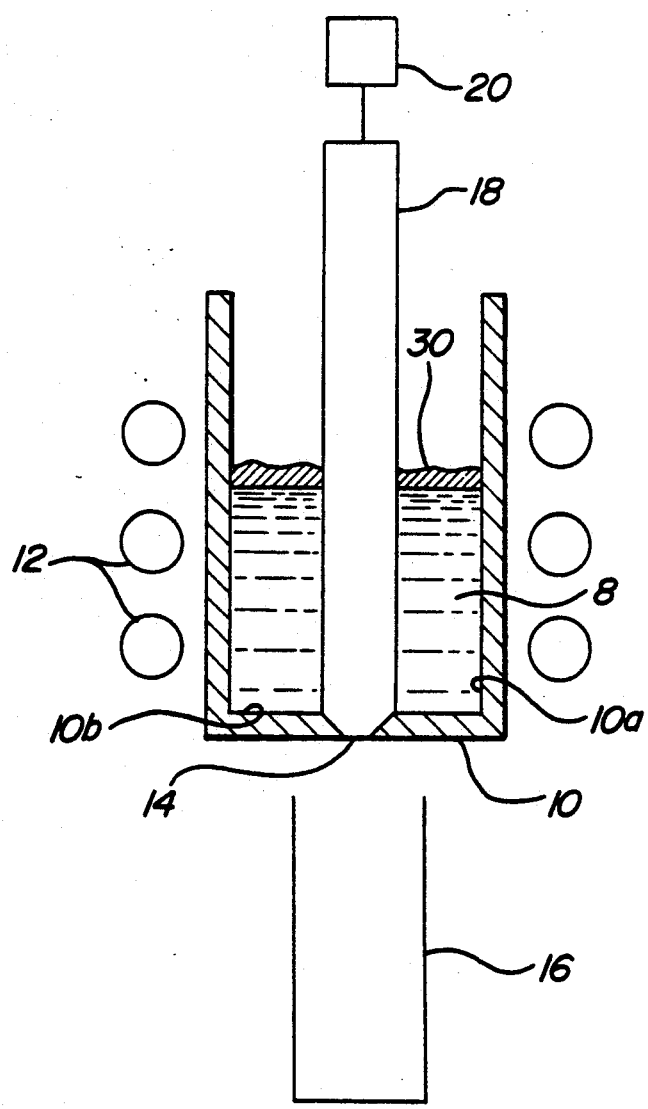
FIG. 2 is a schematic, sectioned side view of a bottom pour apparatus for practicing one embodiment of the invention.

One embodiment of the method of the invention involves purifying the rare earth-transition metal scrap by melting the scrap in a bottom pour refractory container (crucible) 10 shown in FIG. 2. In particular, a charge of the alloy scrap is placed in the refractory crucible 10 and melted by energization of an induction coil 12 disposed around the crucible to form a melt 8 that is purified over time in the crucible via dross formation thereon as described below. The crucible 10 includes a bottom pour opening 14 that is adapted to discharge the purified melt to an underlying water cooled copper mold 16 when the stopper rod 18 is raised to open the discharge opening 14. The stopper rod 18 is initially in the lowered position shown in FIG. 2 to close off the discharge opening 14 during scrap melting and purification. The stopper rod 18 is moved between the lower closed position and the raised open position by a conventional actuator such as a hydraulic cylinder 20 (shown schematically). A thermocouple (not shown) is located inside the stopper rod to monitor the temperature of the melt.

The scrap is melted and held in the crucible under melt temperature and time at temperature conditions to allow formation of dross 30 comprising predominantly the oxides and/or nitrides of the rare earth element of the alloy scrap, such as $Nd_2O_3$ and/or NdN for the Nd-Fe-B magnet alloy scrap mentioned above. This dross forms as a result of the high reactivity of the rare earth element toward oxygen and nitrogen in the melt and the relative insolubility of the resulting rare earth oxide and nitride compounds in the melt. The dross may also contain CaO, $Al_2O_3$, MgO, etc. The dross floats on the melt as a result of its lower density.

Formation of the dross 30 removes substantial tramp oxygen and nitrogen from the melt (melted scrap) so as to substantially purify the melt of these impurities. These tramp impurities are picked up by the scrap during previous fabrication operations to make end-use articles (e.g., magnets). The tramp oxygen and nitrogen impurities present in the scrap are harmful to the magnetic properties of the alloys and must be removed to lower concentration levels before the alloy can be reused in the manufacture of such end-use articles, as will be explained below.

Since formation of the dross (rare earth oxides/nitrides) removes the rare earth constituent from the melt, the level of the rare earth constituent is typically brought up to the level desired in the final melt by addition of a master alloy of rare earth-transition metal. The master alloy has a ratio of rare earth to transition metal (e.g., Fe) selected to accommodate the quantity of rare earth lost by virtue of formation of the oxides/nitrides while maintaining the overall melt chemistry within the desired range.

Following purification of the melt, it is separated from the dross 30 by raising the stopper rod 18 to discharge the melt from the opening 14 into the underlying water cooled copper mold 16. As the purified melt is discharged from the crucible 10, the dross 30 wets and adheres to the crucible side walls 10a and bottom wall 10b to facilitate the melt/dross separation step. The crucible material is selected to promote wetting and adherence of the dross 30 on the side and bottom walls 10a,10b in this manner. Preferably, the crucible 10 comprises alumina ($Al_2O_3$) refractory to this end.

After the mold 16 is filled to the desired level with the purified melt, the stopper rod 18 is lowered to close off the opening 14. The dross 30 is then removed from the crucible walls 10a,10b by peeling and mechanical scraping. The scrap melting/purification process can be then repeated as described above.

The scrap melting/purification operation described above is conducted under a protective partial pressure of high grade (high purity) argon or other inert gas.

The melt is solidified in the water cooled mold 16. The mold 16 is configured to provide an appropriate ingot of the purified rare earth-transition metal alloy for reuse in the manufacture of end-use articles. If desired, the melt can be solidified in mold 16 which is configured in the shape of an electrode for use in a subsequent electroslag melting process (of the type described in copending U.S. Pat. application Ser. No. 591,400 entitled "Method For Treating Rare Earth-Transition Metal Scrap" to further reduce the levels of oxygen and nitrogen and also the levels of certain metallic impurities, such as Li, Na, Al, Si, Ca, Zn, Mg, etc. in the purified melt.

The present invention is not limited to the particular melting process described above and can be practiced using continuous or batch melting processes of various types.

Figure 3:
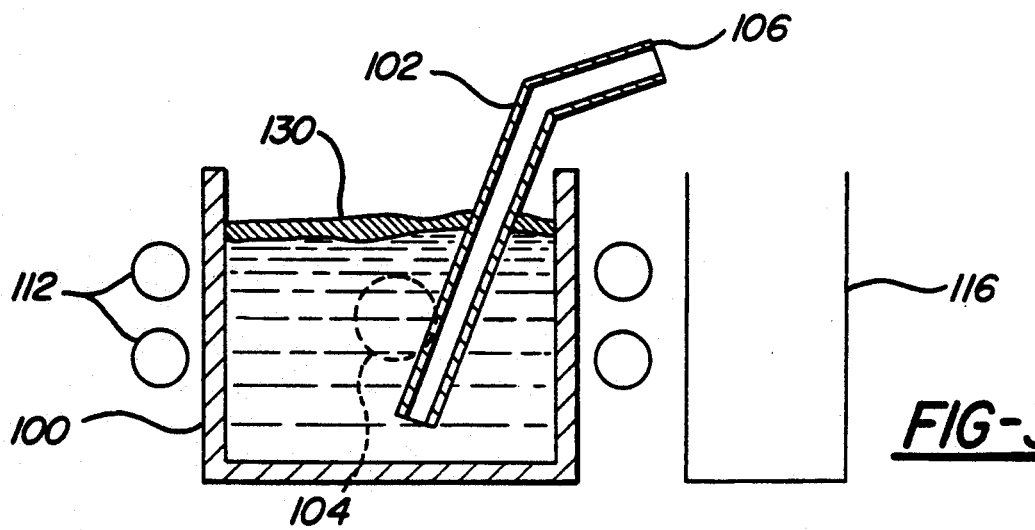
FIG. 3 is a schematic, sectioned side view of lateral pour apparatus for practicing another embodiment of the invention.

Moreover, the invention is not limited to the bottom pour apparatus/process described above. For example, referring to FIG. 3, the charge of the rare earth-transition metal scrap can be melted (by energization of induction coil 112) in a "teapot" refractory crucible 100 that includes a hollow refractory pour tube 102 for discharging the purified melt from the crucible by rotating the crucible 100 about trunnions 104 (one shown) in conventional manner. The purified melt is discharged from the spout 106 of the tube 102 into a water cooled copper mold 116 disposed adjacent the crucible 100. In this way, the purified melt is separated from the dross 130 formed atop the melt. Other types of melt/dross separation techniques may be employed in practicing the invention.

In general, the method of the invention is useful in treating rare earth-transition metal scrap having tramp oxygen and nitrogen impurities at concentration levels unacceptable for use in the manufacture of end-use articles, such as permanent magnets and magnetostrictive devices, such as transducers. In particular, the method of the invention is advantageous in treating rare earth-transition metal scrap having oxygen in the range of about 0.5 to about 0.75 weight % and nitrogen in the range of about 0.05 to about 0.20 weight %, although the invention is not limited to these levels. The method of the invention has proved useful in reducing the concentration levels of oxygen and nitrogen to acceptable levels of about 0.03 weight % or below for oxygen and 0.005 weight % or below for nitrogen. These reduced levels of tramp oxygen and nitrogen achievable by the present invention compare favorably to the levels specified by manufacturers of the end-use articles for these tramp elements, as will become apparent from the Example set forth below.

The dross 30 may be further treated in accordance with a fluorination/precipitation process of the type described in commonly assigned, copending Pat. application Ser. No. 554,189 entitled "Rare Earth/Iron Fluoride And Methods For Making And Using Same" to recover a rare earth/iron fluoride compound useful as a reactant in the well known thermite reduction process as well as other metallothermic reduction processes.

The following Example is offered to illustrate the invention in detail without limiting

EXAMPLE 1

Approximately five kilograms of Nd-Fe-B permanent magnet alloy scrap (about 32 weight % Nd-about 67 weight % Fe-about 1 weight % B) from a manufacturer of permanent magnets were first induction heated and melted in a bottom-pour $Al_2O_3$ crucible. The scrap was heated to a melt temperature of 1550° C. and held at that temperature for 10 minutes under an Ar pressure of approximately 500 mm. A dross layer comprised of $Nd_2O_3$, $Fe_2O_3$, NdN and other metallic oxides and nitrides formed during the melting process. The crucible included a bottom opening (about 1 cm diameter) below which a 10 om diameter by about 30 om length water-cooled copper mold was disposed. The purified melt was bottom cast into the mold by raising a stopper rod to open the crucible bottom opening. The purified melt flowed into the mold while the dross was observed to cling or adhere to the side and bottom walls of the crucible. The melt and dross were thereby separated.

The oxygen, nitrogen, hydrogen and carbon contents of the as-received scrap and the fluxless melted ingot are shown in Table I.

TABLE I

Chemical Analyses of Nd—Fe—B Scrap and Purified Alloy
(Concentration in ppm by weight)

| | O | N | H | C |
|---|---|---|---|---|
| Scrap Before Fluxless Melting | 4950 | 500 | 190 | 380 |
| Ingot After Fluxless Melting | 210 | 43 | 46 | 350 |

It is apparent that the oxygen and nitrogen concentration levels of the scrap were substantially reduced by the fluxless melting treatment of the invention. In particular, the oxygen content was reduced by a factor of approximately 25 while the nitrogen content was reduced by a factor of approximately 10. These reduced levels compare favorably to the corresponding levels specified by the permanent magnet manufacturer for an acceptable Nd-Fe-B alloy; namely, about 0.10 to 0.15 weight % for oxygen and about 0.03 to 0.06 weight % for nitrogen. The hydrogen level was reduced from 190 ppm to 46 ppm. This level of hydrogen is quite acceptable to the magnet manufacturer. The carbon content of the ingot was also within the manufacturer's specification for carbon; namely, about 0.05 weight %.

While the invention has been described in terms of specific embodiments thereof, it is not intended to be limited thereto but rather only to the extent set forth hereafter in the following claims.

We claim:

1. A method of treating rare earth-transition metal scrap contaminated with an impurity element comprising at least one of oxygen and nitrogen for reuse in the manufacture of end-use articles, comprising the steps of:
   a) melting the scrap to form a melt,
   b) forming dross on the melt by reaction of the impurity element and the rare earth of the melt whereby the concentration of said impurity element is reduced in said melt, and
   c) separating the dross and the melt for reuse in the manufacture of end-use articles.

2. The method of claim 1 wherein the melt is formed so as to have dross thereon comprising at least one of a rare earth oxide and rare earth nitride whereby at least one of the oxygen concentration and nitrogen concentration of the melt is reduced.

3. The method of claim 1 including adjusting the concentration of the rare earth in the melt to accommodate for loss thereof as a result of formation of said dross.

4. The method of claim 1 wherein the melt is separated from the dross by discharging the melt from a bottom opening of a crucible containing said melt and said dross, leaving said dross in said crucible.

5. The method of claim 4 wherein the crucible is made of a refractory material to which the dross adheres during discharge of the melt from the bottom opening thereof.

6. The method of claim 5 herein the refractory material comprises alumina.

7. The method of claim 1 including treating the dross to recover a rare earth fluoride useful as a reactant in a metallothermic reduction process.

8. The method of claim 1 wherein the scrap comprises rare earth-transition metal alloy scrap.

9. A method of treating rare earth-iron alloy scrap contaminated with oxygen and nitrogen impurities for reuse in the manufacture of end-use articles, comprising the steps of:
 a) melting the scrap to form a melt,
 b) forming dross on the melt by reaction of the oxygen and nitrogen impurities and the rare earth of the melt whereby the concentrations of said oxygen and nitrogen impurities are reduced in said melt, and
 c) separating the dross and the melt for reuse in the manufacture of end-use articles.

10. The method of claim 9 including adjusting the concentration of the rare earth in the melt to accommodate for loss thereof as a result of formation of said oxide and nitride.

11. The method of claim 9 wherein the melt is separated from the dross by discharging the melt from a bottom opening of a crucible containing said melt and said dross, leaving said dross in said crucible.

12. The method of claim 11 wherein the crucible is made of a refractory material to which the dross adheres during discharge of the melt from the bottom opening thereof.

13. The method of claim 12 wherein the refractory material comprises alumina.

14. The method of claim 11 wherein the melt is discharged and solidified in a mold having a configuration of an electrode for remelting.

15. The method of claim 9 including reducing the concentrations of the oxygen and nitrogen in the melt to at least about 0.03 weight % and 0.005 weight %, respectively.

16. The method of claim 15 wherein the oxygen and the nitrogen concentrations are reduced from initial levels in the scrap of about 0.5 to about 0.75 weight % and about 0.05 to about 0.20 weight %, respectively.

17. The method of claim 9 including treating the dross to recover a rare earth fluoride useful as a reactant in a metallothermic reduction process.

* * * * *

UNITED STATES PATENT AND TRADEMARK OFFICE
CERTIFICATE OF CORRECTION

PATENT NO. : 5,087,291
DATED : February 11, 1992
INVENTOR(S) : Schmidt et al.

It is certified that error appears in the above-identified patent and that said Letters Patent is hereby corrected as shown below:

Column 6, line 60, "herein" should be --wherein--.

Signed and Sealed this

Eighth Day of June, 1993

Attest:

MICHAEL K. KIRK

Attesting Officer

Acting Commissioner of Patents and Trademarks